CRYOTRON USING ANISOTROPIC FERROMAGNETIC FILM

Filed July 23, 1964

INVENTORS
PETER ALBERT WALKER
VICTOR ANDREW JOHN MALLER
PETER ISTVAN BONYHARD
Hane and Nydick
ATTORNEYS United States Patent Office 3,398,299
Patented Aug. 20, 1968

3,398,299

CRYOTRON USING ANISOTROPIC FERROMAGNETIC FILM

Peter Albert Walker, Stevenage, Victor Andrew John Maller, Stotfold, and Peter Istvan Bonyhard, Stevenage, England, assignors to International Computers and Tabulators Limited Filed July 23, 1964, Ser. No. 384,724
Claims priority, application Great Britain, July 25, 1963, 29,508/63, 29,509/63, 29,510/63, 29,511/63
7 Claims. (Cl. 307—245)

ABSTRACT OF THE DISCLOSURE

A cryogenic switching device includes a superconductive gate conductor, the inductance of which is switched between two values by a ferromagnetic element coupled to the gate conductor and which has one of two values of permeability in dependence upon the value of an applied magnetic field. The forromagnetic element is preferably a thin anisotropic magnetic film having hard and easy axes of magnetization and the gate conductor is aligned with one or the other axis. The magnetic field is applied by a control conductor which may be parallel or perpendicular to the gate conductor.

Figures 1, 2:
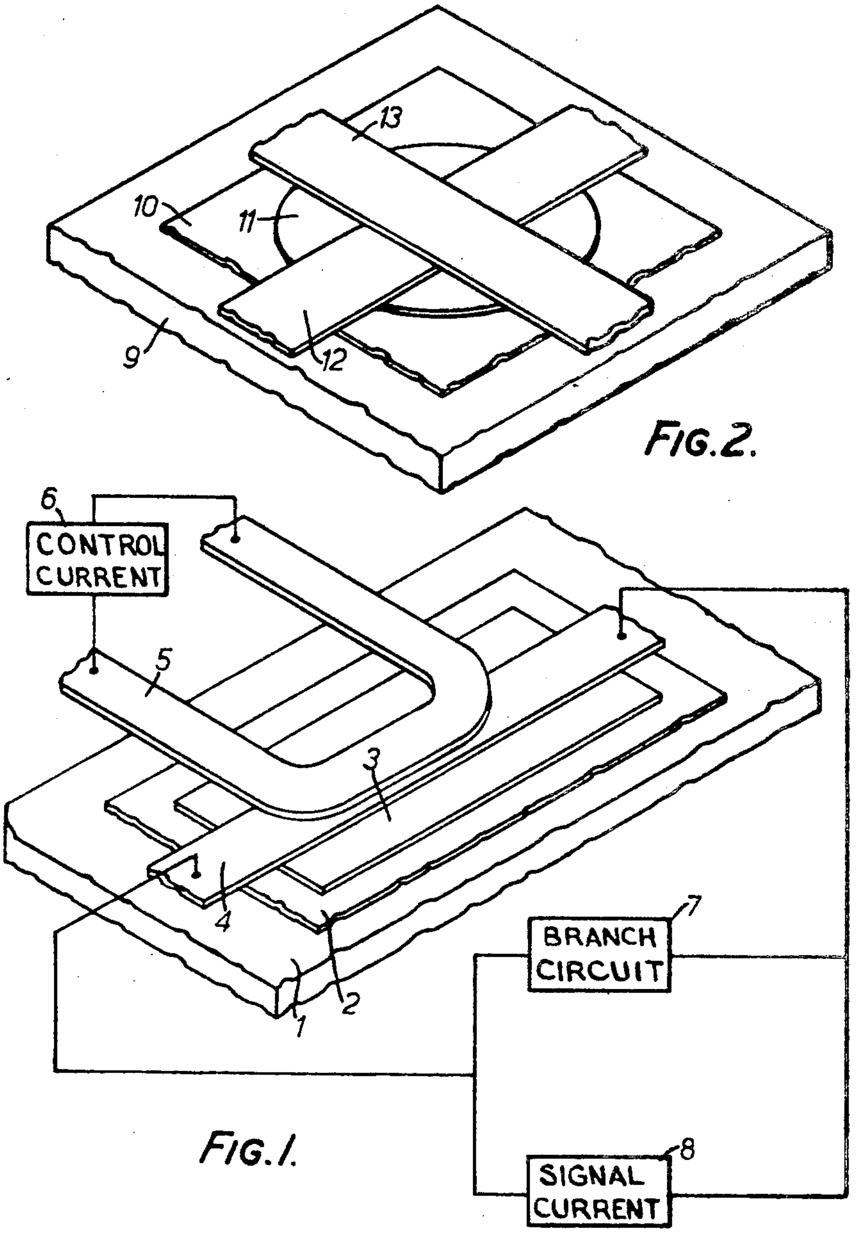

This invention relates to cryogenic switching devices.

In known forms of cryogenic switching devices, switching is accomplished by causing superconductive conductors to switch between superconducting and normally conducting states. For example in devices known as cryotrons, a conductor which carries signals is switched between superconducting and normally conducting states by an externally applied magnetic field. One form of cryotron is described in an article entitled, "An Improved Film Cryotron and Its Application to Digital Computers," by Newhouse, Brewer and Edwards, published in Proc. I.R.E., August 1960, pp. 1395–1404. Another form of cryotron is described in an article entitled "The In-Line Cryotron," by A. E. Brennemann in Proc. I.R.E., March 1963, pp. 442–451.

In another known cryogenic switching device, the inductance of a coil is switched between low and high values by switching a screen of superconductive material between superconducting and normally conducting states whereby magnetic flux produced by current in the coil is respectively unable and able to link with a magnetic core in the coil.

The object of the invention is to provide an improved form of cryogenic switching device.

According to the invention an electrical switching device includes an element of ferromagnetic material; a superconductive gate conductor magnetically coupled to said ferromagnetic element; and means to apply at least two different values of magnetic field to said ferromagnetic element such that the ferromagnetic element assumes different values respectively of effective permeability so that the self inductance of the gate conductor has different values in dependence on said applied magnetic field.

Embodiments of the invention will now be described by way of example with reference to the accompanying drawings in which:

FIGURE 1 illustrates one form of switching device constructed according to the invention and having mutually parallel gate and control conductors, and FIGURE 2 illustrates another form of the switching device having mutually perpendicular gate and control conductors.

Referring to FIGURE 1, a substrate 1 carries a superconductive ground plane 2. A magnetic element consisting of an area 3 of a thin ferromagnetic film is deposited on the ground plane 2. A gate conductor 4 is deposited so as to extend across the area 3 of magnetic film and a control conductor 5 is deposited over the gate conductor such that the conductors 4 and 5 are aligned in the same direction in the region of the magnetic element 3. The conductors 3 and 4 are insulated from one another and from the ground plane 2 by layers of insulating material. These insulating layers are not illustrated, in order to clarify the drawings. It is not essential that the magnetic element 3 be deposited between the ground plane 2 and the conductors 4 and 5, but the main requirement is that the magnetic element should be closely coupled magnetically to both the conductors 4, 5.

The magnetic element 3 is preferably a thin anisotropic magnetic film which exhibits mutually perpendicular hard and easy axes of magnetization. It may be a nickel/iron alloy. The deposition of the magnetic film is carried out in such a way that the easy axis is parallel to the gate and control conductor. Consequently, the magnetic fields produced by currents in the two conductors are applied to the magnetic film in the hard direction.

The hysteresis characteristics of anisotropic magnetic films are shown and described in an article entitled "Magnetisation Reversal by Rotation and Wall Motion in Thin Films of Nickel/Iron Alloys," by Bradley and Prutton, published in Journal of Electronics and Control for January 1959, pp. 81–96. This shows that the theoretical hysteresis curve in the hard direction is a sloping line passing through the origin and terminated by horizontal portions corresponding to regions of magnetic saturation. Films can be made with hysteresis curves approximately the theoretical curve.

If a relatively small current flows through the gate conductor 4, the resultant field in the magnetic film is such that it is operating on the sloping portion of the hysteresis curve. A small change in the applied field causes an appreciable change in the magnetic induction over this part of the curve, so that the effective permeability of the film is quite large. Consequently, the presence of the magnetic film element 3 causes the self-inductance of the gate conductor 4 to be considerably greater than the residual value.

If a current is now applied to the control conductor 5, from a source 6 the field in the magnetic film 3 can be increased to the saturation value, that is, the operating point is moved on to a horizontal portion of the hysteresis curve. The permeability of the film in this region is substantially unity, so that the self inductance of the gate conductor 4 falls to substantially the residual value. Thus, the self inductance of the gate conductor 4 can be switched between relatively high and low values by current in the control conductor 5.

A current applied to two superconducting paths in parallel divides in the inverse ratio of their inductances. Consequently, if a branch circuit 7 of suitable self inductance is connected in parallel with the gate conductor 4 of the present device, the majority of the current from a source 8 will flow in the gate conductor 4 or the circuit 7 in accordance with the low or high inductance condition of the gate conductor 4. The branch circuit 7 may be a simple superconductive loop, or it may be the gate conductor of a second controlled inductance device. A circuit element (not shown) to be controlled by the switching device may be included either in the branch circuit 7 or connected in series with the gate conductor 4. Alternatively such circuit elements may be included both in the branch circuit and in series with the gate conductor 4.

The hysteresis curve referred to above is obtained when the area of magnetic film behaves as a single domain. The film may break up into a set of anti-parallel domains, due to the demagnetizing field, if the film area is below a certain size which depends on the thickness and magnetic properties of the film. This produces a different hysteresis curve, but much of the same effect is obtained provided that the rise time of applied currents is sufficiently short.

In the simple embodiment described above, the application of a current to the control conductor will cause a circulating current to flow in any superconducting closed loop of which the gate conductor forms part. This arises from the tendency for the magnetic flux linked with a superconducting circuit to remain constant. The current in the control conductor produces a flux linking with the gate conductor and this induces a circulating current which provides a flux opposing that due to the control conductor. This circulating current may be suppressed by ensuring that there is no net flux change in the gate conductor. This may be done, for example, by using a control conductor having two opposed loops coupled to the gate conductor, only one of the loops being coupled to the film. Alternatively, the presence of the circulating current may be allowed for in the design of the device or actually utilized.

The ground plane 2 is formed of a material having a high critical field so that during operation of the device it always remains in a superconducting state. Similarly the conductors 4 and 5 are formed of a material which demains superconductive during operation of the device. A suitable material for the ground plane is niobium and the conductors may be of niobium or lead. Thus it will be seen that the switching operation of the device takes place without any part of the circuit being switched to the normally conductive, i.e., resistive, state, as is necessary in the known cryogenic switching devices. This inductive switching provides higher switching speeds and more tolerance in construction as compared with prior devices.

An alternative form of switching device is shown in FIGURE 2. A substrate 9 carries superconductive ground plane 10 on which is deposited a magnetic element 11. The magnetic element 11 consists of an area of thin anisotropic magnetic material having mutually perpendicular hard and easy axes of magnetization. A gate conductor 12 is deposited so as to extend across the element 11 and a control conductor 13 is deposited so as to extend across the element 11 at right angles to the gate conductor 12. The magnetic film element 11 is deposited in such a way that the hard axis of the element is substantially aligned with the gate conductor 12 and the easy axis is substantially aligned with the control conductor 13.

In the article by Bradley and Prutton, hereinbefore referred to, it is shown that the theoretical hysteresis loop of the film in the easy direction, with no field in the hard direction, has the well known rectangular form. The hysteresis loop changes to an approximately S-shape when a field equal to the anisotropy field is applied in the hard direction. It is also shown that films can be made with characteristics which approach quite closely to the theoretical characteristics.

If a current flows through the gate conductor 12, the resulting field will be applied to the magnetic film 11 in the easy direction. Consequently, the effect of the magnetic film 11 on the gate conductor 12 will be determined by the characteristics of the magnetic film in the easy direction. Provided that the field produced by the current in the gate conductor is fairly small, the film will be operating on the substantially horizontal part of the rectangular hysteresis characteristic. An incremental change of current in the gate conductor 12 will produce practically no change in magnetic induction under these conditions since the effective permeability of the magnetic film is close to unity. Consequently, the self inductance of the gate conductor 12 is not appreciably increased by the presence of the magnetic film 11.

If a current is now applied to the control conductor 13 to produce a field in the hard direction of the film 11 equal to the anisotropy field, the film will be operating somewhere along the relatively steeply sloping central part of the S-shaped hysteresis characteristic. Under these conditions the effective permeability of the magnetic film 11 in the easy direction is large, and it is therefore causing a large increase in self inductance of the gate conductor 12. Consequently when the control current is zero the majority of the current flows through the gate conductor, and when the control current is applied, the majority of the current is diverted to a branch circuit (not shown).

The magnetic axes of the film 11 may be turned through 90° relative to the conductors. The gate conductor 12 now provides a hard direction field. The film has a high initial permeability in this direction, so that the gate conductor presents a high inductance. Current in the control conductor produces a field in the easy direction and this reduces the permeability in the hard direction. The control characteristics are therefore inverted.

In discussing the operation of the device shown in FIGURE 2, it has been assumed that the area of magnetic film behaves as a single domain. This is not necessarily true for small areas, which may break up into anti-parallel domains due to the demagnetizing field. The device will still work under these conditions provided that the switching current has a short rise time compared with the switching speed of the film. The shape of the hysteresis curve is not the same as for single domain operation, but it still provides a region of relatively high incremental permeability for rapidly changing fields.

In the above described switching devices, the switching operation takes place without any part of the circuit being switched to the resistive state as is necessary in the conventional cryotron. This inductive switching provides higher switching speeds and more tolerance in construction as compared with the cryotron.

The Brennemann and Newhouse et al. articles point out that the switching speed is limited by the *L/R* time constant of the circuit. There is also a limitation on frequency of switching due to the power dissipated each time the gate conductor goes resistive. Neither of these limitations apply to inductive switching, since the circuit remains superconductive. The same article also points out that non-uniformity in thickness of the gate film causes the film to switch a part at a time. This produces an ill-defined transition point. The inductive switching device is operated below the transition point, so that non-uniformity thickness is no problem. The construction is further simplified by the fact that both the gate and control conductors may be made of the same material.

The inductive switching device may be combined into logical circuits in much the same way as cryotrons. For example, the gate conductors of a pair of the devices may be connected in parallel to form a simple bistable device. The majority of the current flow in one gate conductor or the other, depending upon which control conductor is energized. The state of the bistable device may be sensed by any of the methods used with conventional cryotrons, or by the inductive sensing arrangement described in our copending application.

More than one control conductor may be provided for a single gate conductor. A full current applied to any one of the control conductors is sufficient to cause switching of the gate conductor, so that an OR function input is provided. If half currents are used additively, then a device with three control conductors will provide a majority logic element for 2 out of 3 operation.

The inductive switching device described above with reference to FIGURE 2 may be constructed to provide a power gain. It can therefore be used to form complex logical circuits, such as adders, etc. It can also be used to form selection trees such as are necessary for the selection of an address in a matrix store. In the latter case, it is not necessary for the device to have a power gain.

Although it is preferable for the conductors to be aligned with the magnetic axes, it is not essential. The ratio between the permeability with and without control current decreases as the angular misalignment increase, due to the changing shape of the hysteresis characteristics, but some degree of misalignment can be tolerated.

The above described switching devices may also be utilized for sensing current flow in a conductor of a cryogenic device. The control conductor of the switching device is connected so as to carry the current which is to be sensed and therefore the gate conductor of the above described devices assumes high or low values of self inductance in dependence upon the flow of said current. Therefore the presence, or absence of current is indicated by the inductance state of the gate conductor.

The embodiment described above with reference to FIGURE 1 utilizes a thin magnetic film with uniaxial anisotropy. However it will be appreciated that any magnetic material may be used which provided two widely different values of effective permeability in dependence on the value of applied magnetic field.

We claim:

1. An electrical switching device including an element of ferromagnetic material, said ferromagnetic material having a first value of effective permeability in response to a first value of applied magnetic field and having a second value of effective permeability in response to a second value of applied magnetic field; a superconductive strip magnetically coupled to said element; and means operable to apply selectively said first value of magnetic field and said second value of magnetic field to said element so that the superconductive strip has first and second values of self-inductance in response to said first and second values of applied field respectively.

2. An electrical switching device including an element of thin anisotropic ferromagnetic film having mutually perpendicular hard and easy axes of magnetization; a first conductor magnetically coupled to said element and extending parallel to said easy axis; a second conductor magnetically coupled to said element and extending parallel to said hard axis; first means to apply a signal current to said first conductor; and second means to pass first and second values of current selectively through said second conductor to control the passage of the signal current through said first conductor.

3. An electrical switching device including a superconductive signal conductor; an element of thin anisotropic magnetic film having mutually perpendicular hard and easy axes, said element being magnetically coupled to said signal conductor with one of said axes aligned with said signal conductor; a control conductor magnetically coupled to said element; means operable to energize said control conductor with first and second values of current selectively to produce first and second values respectively of magnetic field at said element; said element having a first value of permeability in response to said first value of magnetic field so that the signal conductor has a first value of self inductance and having a second value of permeability in response to said second value of magnetic field so that the signal conductor has a second value of self inductance.

4. An electrical switching device as claimed in claim 3 in which the control conductor extends perpendicular to the signal conductor.

5. An electrical switching device as claimed in claim 4 in which the signal conductor is aligned with the hard axis.

6. An electrical switching device as claimed in claim 3 in which the control conductor extends parallel to the signal conductor.

7. An electrical switching device as claimed in claim 6 in which the signal conductor is aligned with the easy axis.

References Cited

UNITED STATES PATENTS 3,191,063 6/1965 Ahrons ............ 307—88.5

JOHN S. HEYMAN, *Primary Examiner.*

J. D. FREW, *Assistant Examiner.*